US008238378B2

(12) United States Patent
Benveniste

(10) Patent No.: US 8,238,378 B2
(45) Date of Patent: *Aug. 7, 2012

(54) EMERGENCY CALL HANDLING IN CONTENTION-BASED WIRELESS LOCAL AREA NETWORKS

(75) Inventor: Mathilde Benveniste, South Orange, NJ (US)

(73) Assignee: Avaya Inc., Basking Ridge, NJ (US)

( * ) Notice: Subject to any disclaimer, the term of this patent is extended or adjusted under 35 U.S.C. 154(b) by 112 days.

This patent is subject to a terminal disclaimer.

(21) Appl. No.: 12/819,647

(22) Filed: Jun. 21, 2010

(65) Prior Publication Data

US 2010/0254365 A1    Oct. 7, 2010

Related U.S. Application Data

(63) Continuation of application No. 10/770,817, filed on Feb. 3, 2004, now Pat. No. 7,817,675.

(60) Provisional application No. 60/444,196, filed on Feb. 3, 2003.

(51) Int. Cl.
*H04J 3/06* (2006.01)
*H04J 3/00* (2006.01)
*H04J 3/08* (2006.01)

(52) U.S. Cl. ......... 370/508; 370/498; 370/336; 370/326

(58) Field of Classification Search ............. 370/508, 370/350, 447, 462, 346, 336, 326, 322, 329, 370/252, 345, 395.21, 519, 509, 510, 498
See application file for complete search history.

(56) References Cited

U.S. PATENT DOCUMENTS 6,801,524 B2 * 10/2004 Eteminan ............... 370/352
7,817,675 B2 * 10/2010 Benveniste ............. 370/508

* cited by examiner

*Primary Examiner* — Eugene Yun
(74) *Attorney, Agent, or Firm* — Chapin IP Law, LLC

(57) ABSTRACT

An apparatus and methods for handling emergency message frames (e.g., "911" call frames, etc.) sent by a station in a wireless local-area network are disclosed. The illustrative embodiment increases the probability with which an emergency message frame is accorded the singularly highest quality-of-service by modifying one or more IEEE 802.11e parameters (e.g., back-off contention window length, Arbitration Inter-Frame Space [AIFS], etc.) for a station or access point that transmits an emergency message frame.

4 Claims, 1 Drawing Sheet

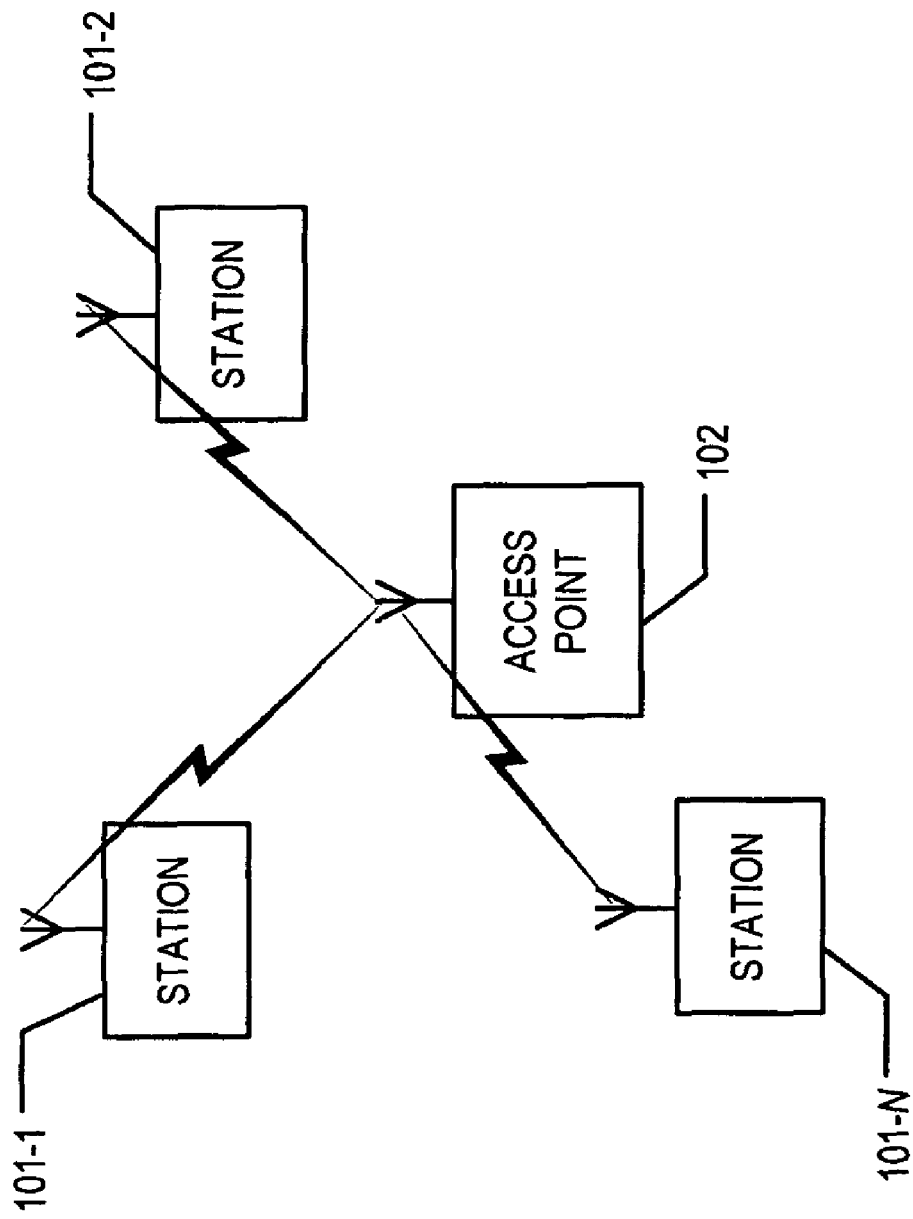

EMERGENCY CALL HANDLING IN CONTENTION-BASED WIRELESS LOCAL AREA NETWORKS

CROSS REFERENCE TO RELATED APPLICATIONS

The present application is a continuation of pending U.S. patent application Ser. No. 10/770,817, filed Feb. 3, 2004 now U.S. Pat. No. 7,817,675, entitled "Emergency Call Handling in Contention-Based Wireless Local Area Networks," which claims the benefit of U.S. provisional patent application Ser. No. 60/444,196, filed Feb. 3, 2003, entitled "Handling 911 Calls in a Wireless LAN," which are both incorporated herein by reference in their entirety.

FIELD OF THE INVENTION

The present invention relates to telecommunications in general, and, more Particularly, to techniques for handling emergency calls in wireless local-area Networks.

BACKGROUND

FIG. 1 depicts a schematic diagram of a wireless local-area network 100 in the prior art, which comprises: access point 101, stations 102-1 through 102-N, wherein N is a positive integer, and hosts 103-1 through 103-N, interconnected as shown. Each station 102-$i$, wherein $i$ is a member of the set {1, 2, . . . N}, enables host 103-$i$ (a device such as a notebook computer, personal digital assistant [PDA], tablet PC, etc.) to communicate wirelessly with other hosts in local-area network 100 via access point 101.

QoS traffic (i.e., delay and jitter sensitive applications, like voice and video streaming) receives special treatment on the channel of a wireless LAN through special protocols for medium access control. The new draft standard for 802.11 LANs under preparation by Task Group E, referred to as 802.11e, offers a choice of two protocols, EDCF—a distributed random access protocol—and EPCF—a is centralized deterministic polling protocol.

Distributed Access Protocol: EDCF, the QoS-enhanced version of the existing 802.11 DCF protocol, is a distributed random access protocol that allows delay and jitter sensitive frames to be transmitted with higher priority than 'best-effort' frames (i.e., frames that are insensitive to delay or jitter). Frames in the higher priority access categories can access the channel or start countdown of their back off delay after waiting for a shorter idle time interval following a transmission on the channel. Upon collision, priority access categories will double their contention window, but the maximum size achieved may vary by access category. This allows higher priority frames to stop doubling their contention window size sooner than lower priority categories, thus affording another means of differentiation.

Centralized Polling Protocol: EPCF, the point-coordinated version of what is referred to in 802.11e as HCF, is a centralized deterministic polling protocol that treats delay/jitter sensitive traffic preferentially when granting opportunities for uplink transmission. In a centralized polling protocol, the Access Point (AP) sends polls to the clients granting them the opportunity to transmit. Since a node transmits only upon receiving a poll, transmission is contention-free. Such a protocol may waste channel time, however, if it generates polls to stations having no data to transmit.

The choice of a protocol to use is complex, as it depends among other things on the type of traffic generated in a WLAN cell and on the overlap of the coverage areas of co-channel APs. While a detailed appraisal of the advantages of each protocol is outside the scope of this paper, it is interesting to note that in situations where the majority of the traffic in a cell is QoS traffic, the preferential treatment afforded to QoS frames by either protocol is irrelevant, as there are no frames over which QoS frames would gain preferential treatment. The comparison must be based on delay and throughput. The question then is becomes: "which protocol accommodates more simultaneous independent QoS traffic streams within acceptable delay/jitter limits"? It is easy to see that the centralized polling protocol does better because channel time is not lost to contention. It is expected that, in general, there will be a mix of clients in a cell, some capable of communication based on the EDCF MAC protocol only, while others are able to communicate through either MAC protocol. Some APs may not provide EPCF service.

Emergency voice calls, referred to in the U.S. as '911 calls', are of special concern in wireless LANs. There are two issues that require attention: call setup and voice data transmission: Attention must thus be paid to the following: (a) 911 calls must be set up promptly and (b) the voice in 911 calls should be heard with clarity to enable emergency response. With respect to the former, transmission for signaling packets must rely exclusively on the distributed MAC protocol (like EDCF), as the request to be polled (in situations where polled access is available) relies also on EDCF, and negotiation of that request may not be completed until after call setup. With respect to the latter, voice packets must be afforded sufficient prioritization so that they are transmitted within acceptable QoS specifications, regardless of the traffic load on the WLAN. If the 911 call is not handled with a deterministic centralized polling MAC protocol (like HCF polling), special provisions must be made for the 911 voice packets, to ensure that they are transmitted promptly.

SUMMARY OF THE INVENTION

In an emergency 911 call, the calling client in a wireless LAN will generate signaling frames to set up a call. Signaling packets for call setup of a 911 call must be transmitted to the AP, on the wireless channel, quickly and reliably. In the interest of generality, we include among signaling frames the TSPEC request that might be sent by the client to reserve its position on the polling list in the is case of EPCF access.

Signaling frames must be send through the basic channel access mechanism, EDCF. The top priority EDCF class would be the fastest way to send these frames. If the top priority EDCF class includes other traffic, however, there may be substantial delay and collisions, depending on the traffic load and the 'admission control' policy practiced in the cell. The signaling packets would risk being dropped, due to excessive retransmission attempts.

To avoid delay or loss of 911 signaling frames, they can be treated in a special way. One way would be to transmit 911 signaling frames with the same access priority as the AP. That is, AIFS would beset equal to P IFS. The backoff delay used to transmit 911 signaling frames could be set equal to 0, or to the minimum allowable backoff value. If a collision occurs, a station sending 911 signaling frames would back off, just like an AP that experiences a collision when setting up a controlled contention period (CAP); the contention window size for this backoff delay would be small. Alternatively, since the likelihood of a 911 call is low, and thus collisions among 911 signaling frames are unlikely. 911 signaling frames could retransmit with the same backoff. It is important in the latter approach to contention resolution for 911 frames to require the AT to access the channel with a non-zero backoff delay following a collision.

An alternative and less aggressive approach would be to transmit the signaling frames using 'privileged access'. Privileged access is described below.

BRIEF DESCRIPTION OF THE DRAWINGS

FIG. 1 depicts a schematic diagram of an exemplary wireless local-area network 100 in the prior art.

DETAILED DESCRIPTION

Once a 911 call has been set up, voice data frames are generated as a is constant periodic stream as voice is sampled periodically. To ensure audible quality voice data frames must arrive within a specified delay and with limited fitter. The delay and fitter requirements can be met more easily on the downlink (from the AP to the client) than on the uplink (from the client to the AP). A simple way for the AP to give 911 frames preferential treatment on the downlink is to have 911 frames queued separately, and to transmit them within the specified time limits.

Uplink transmission may be problematic, depending on the MAC protocol used. Centralized deterministic polling (as in EPCF) can meet the requirements for good voice quality more readily. The implementation of the polling schedule should give the station with the 911 call preferential treatment; that is, it should be scheduled for polling, even if that means that another call that has been admitted and accepted for polling may have to be denied polling service.

Behavior of distributed random access protocols, however, is not under the direct control of the AP. With EDCF, the voice quality QoS requirements may not be met under heavy traffic loads. Since all clients may not operate under the EPCF protocol, or all APs may not offer EPCF access service, it is important to provide a mechanism that enables the voice frames of a 911 call to be delivered within the specified time constraints.

As in the case of 911 signaling frames, voice frames of a 911 call could be delivered with an AIFS of PITS. The backoff delay could be set to minimum allowable value, and collisions could be resolved by leaving the backoff unchanged. This approach, however, could be excessively aggressive, as the probability of collision with the AP is increased due to number of voice data frames generated at regular intervals. Frequent collisions would interfere with the smooth operation of the AP. Alternatively, privileged access can be used to transmit 911-voice data frames uplink.

Privileged access would be afforded to certain frames in the top priority access category. Privileged frames contend for the channel with the same AIFS access parameter as the rest of the frames in the top priority access category. However, the backoff contention window used to draw a backoff delay randomly would be different. Privileged frames could start with a shorter contention window than the frames in the top priority access category. The probability of a collision with a frame from another privileged client is very small, as few clients engage in applications qualifying for privileged access. A privileged frame may collide with non-privileged frames. In the event of a collision, retransmission of a frame may be attempted with the same, or shorter, contention window than that used previously, whereas the colliding frame must increase or retain the same contention window size upon a retransmission attempt. For better results, the contention window should be shortened when attempting retransmission of a privileged frame if the frames in the top priority category maintain the same contention window after a collision. The probability of collision with the same frame is reduced significantly. Any subsequent collisions with other frames would be resolved similarly, thus eliminating possible contenders and increasing the probability of successful transmission of the privileged frame.

With few clients engaged in applications that qualify for privileged access (such as 911 calls), a shorter contention window would work. A minimum size on the contention window can be imposed, if desired. That is, after reducing the contention window following one or more consecutive collisions, the contention window size of a privileged frame will remain constant.

Other frames may be afforded privileged access as well, provided they arise infrequently and do not coincide with a 911 call. For example, a reservation request (RR) may be used in conjunction with voice calls employing HCF polling. RRs would not increase contention, as they are infrequent.

According to the draft 11e standard, a client maintains four queues, one is for each access category. Privileged access can be achieved by using the same four queue structure, provided the client has no other frames queued in that access category when the privileged frame reaches the queue. The rules for setting the contention window size for the top priority access category would be suspended for the duration of a 911 call only for the station making the call, and would restored upon completion of the 911 call. For instance, the CWmin value could be set to 4, CWmax would be 2, with CW being halved upon collision and retrial, for the duration of a 911 call.

The mechanism of allowing the top priority category parameters to change temporarily would not cause major unfairness in prioritized access. Only the station engaged in a rare event, such as an emergency call, would be allowed to use the privileged access parameter settings. It is unlikely that frames in the top priority category would gain preferential treatment, as that category is reserved primarily for voice calls. A client would typically engage in one voice call at a time.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:
1. A method comprising:
generating a first traffic stream of digital packets for transmission into a shared-communications channel, wherein said first traffic stream is the only privileged traffic stream contending for access to said shared-communications channel, and wherein said first traffic stream comprises at least one voice frame of an emergency call;
selecting a first back-off delay for said voice frame of an emergency call from a first back-off contention window;
transmitting the voice frame of an emergency call into a shared-communications channel at said first back-off delay;
detecting a collision on said shared-communications channel during the transmission of said voice frame of an emergency call;
selecting a second back-off delay for said voice frame of an emergency call from a second back-off contention window, said second back-off delay smaller than said first back-off delay in order to provide said voice frame of an emergency call priority over other data on said shared-communications channel; and re-transmitting said voice frame of an emergency call into said shared-communications channel at said second back-off delay to provide said voice frame of an emergency call with priority over other traffic on the channel.

2. The method of claim 1 further comprising:

detecting a collision on said shared-communications channel during the re-transmission of said voice frame of an emergency call;

selecting a third back-off delay for said voice frame of an emergency call from a third back-off contention window, said third back-off delay smaller than said second back-off delay in order to provide said voice frame of an emergency call priority over other data on said shared-communications channel; and again re-transmitting said voice frame of an emergency call into said shared-communications channel at said third back-off delay.

3. An apparatus comprising:

a processor for (I) generating a first traffic stream of digital packets for transmission into a shared-communications channel, wherein said first traffic stream is the only privileged traffic stream contending for access to said shared-communications channel, and wherein said first traffic stream comprises at least one voice frame of an emergency call (ii) selecting a first back-off delay for said voice frame of an emergency call from a first back-off contention window, and (iii) selecting a second back-off delay for said voice frame of an emergency call from a second back-off contention window, said second back-off delay smaller than said first back-off delay in order to provide said voice frame of an emergency call priority over other data on said shared-communications channel;

a transmitter for (i) transmitting a voice frame of an emergency call into a shared-communications channel at said first back-off delay, and (ii) re-transmitting said voice frame of an emergency call into said shared-communications channel at said second back-off delay to provide said voice frame of an emergency call with priority over other traffic on the channel in the event of a collision; and a receiver for (i) detecting a collision on said shared-communications channel during the transmission of said voice frame of an emergency call.

4. The apparatus of claim 3 wherein:

said receiver is further for (ii) detecting a collision on said shared-communications channel during the re-transmission of said voice frame of an emergency call;

said processor is further for (iv) selecting a third back-off delay for said voice frame of an emergency call from a third back-off contention window, said third back-off delay smaller than said second back-off delay in order to provide said voice frame of an emergency call priority over other data on said shared-communications channel; and said transmitter is further for (iii) again re-transmitting said voice frame of an emergency call into said shared-communications channel at said third back-off delay.

* * * * *